United States Patent [19]
Theobald

[11] 3,729,791
[45] May 1, 1973

[54] METHOD OF EFFECTING A PIPE COUPLING

[75] Inventor: Reiner Theobald, Frankdurt am Main, Germany

[73] Assignee: Vereinigte Deutsche Metallwerke AG, Frankfurt am Main, Germany

[22] Filed: June 1, 1971

[21] Appl. No.: 148,533

[52] U.S. Cl. ............... 29/157 R, 29/451, 29/DIG. 25
[51] Int. Cl. .................... B21d 53/00, B21k 29/00
[58] Field of Search .................... 29/DIG. 35, 157 R, 29/157 T, 451, 453, DIG. 25

[56] References Cited

UNITED STATES PATENTS

| | | | |
|---|---|---|---|
| 2,889,089 | 6/1959 | Herrick et al. | 29/451 UX |
| 3,217,400 | 11/1965 | Illesy et al. | 29/453 |

FOREIGN PATENTS OR APPLICATIONS

| | | | |
|---|---|---|---|
| 538,348 | 1/1956 | Italy | 29/DIG. 35 |

Primary Examiner—Charles W. Lanham
Assistant Examiner—D. C. Reiley, III
Attorney—Karl F. Ross

[57] ABSTRACT

A synthetic-resin pipe fitting having a plurality of tubular arms, at least one of which is provided with an annular transverse flange, is provided with a coupling ring by heating the flange to a temperature above the crystallite melting point or the glass-transition temperature, and forcing the ring over the flange. The fitting is made from a memory-effect synthetic resin, preferably cross-linked polyethylene, so that upon cooling the flange is restored to its original relatively rigid condition and undeflected configuration.

4 Claims, 2 Drawing Figures

Reiner Theobald
Inventor.

By Karl J. Ross
Attorney

CROSS-LINKED POLYETHYLENE

METHOD OF EFFECTING A PIPE COUPLING

FIELD OF THE INVENTION

My present invention relates to pipe-connection systems and, in general, to a method of and a coupling for joining tubular members of various types for releasable interconnection.

BACKGROUND OF THE INVENTION

In the connection of tubular members, e.g. pipes, numerous coupling systems have been proposed. The major classes are those using direct threads, fitted joints, potting compounds, compression fittings and flange joints.

In the direct-thread coupling, the pipe fitting is provided with an internal or external thread and a mating or complementary thread is formed on the pipe to be affixed thereto. The two members are then aligned and joined by screwing one into the other. Such systems have the advantage that no additional members are required, but have not been found to be satisfactory when the two members are composed of different materials, when the cost of forming a thread directly on a pipe fitting is high, and when relative rotation of the two-pipe members or the pipe fitting and the member attached thereto is not possible.

In potted systems, the ends of a pair of tubular members are brought into proximity, e.g. into male/female interfitting relationship, and a sealing composition is cast into the gap between them and/or around the mated ends of the pipe members. The mechanical interconnection of the male and female members may be preceded by a sealing step in which a ring or the like is driven into the gap before the sealing composition is applied. While these systems have been found to be useful with pipe members of different compositions, the formation of the joint is difficult and often requires highly skilled personnel and is nonreversible in the sense that the joint cannot readily be opened or the fitting removed easily from the pipe.

In friction-fitting systems, the male pipe member and the female pipe member are provided with complementary tapers and the joint is established simply by driving the male member into the female member or by forcing the female member over the male member. Such friction fits may be accompanied by other sealing or attachment techniques and are confined to synthetic-resin pipes. Where, however, pipes of different materials are to be joined, the friction-fit has been found to be unsatisfactory. Furthermore, where the friction fit is sufficiently effective to prevent linkage, it often cannot be taken apart without damage to one or both members.

Compression fittings make use of the wedge action of a sleeve surrounding a pipe and having a tapered surface which, upon tightening of the coupling, bears sealingly and inwardly against a ring applied to the otherwise smooth-surfaced pipe or fitting member. This system requires a fitting or pipe member of sufficient rigidity to resist the inward compression forces and is generally not suitable for use with large pipes or for joining tubular members of different materials together.

Among the flange-type couplings which have been provided heretofore, I may mention those using direct attachment of the two flanges by providing them with aligned bores or the like through which bolts are passed. Indirect techniques use collars behind the flanges and draw the collars together by bolts which may be arranged outwardly of the flange but extend axially to bridge the two collars. Still another arrangement uses a nut rotatable on one collar to engage threadedly the collar behind the flange of the other pipe member. Such systems have not been found to be applicable to arrangements in which, for example, two flanges are formed on the pipe member before the collar or ring is applied or where the pipe member is a fitting having two or more arms, each of which may be flanged. Hence, screw-type flange couplings have not found significant utility in systems in which the pipe member is a pipe bend, a Y-fitting, a T-fitting or the like. The difficulty in these cases is that the flanges prevent application of the collar if the latter is in one piece and the manipulation of multipiece collars, held together by screws and the like, is inconvenient.

I may also note that flange-type couplings as described are desirable for many uses in which other couplings are not satisfactory. For example, screw-threads formed directly in plastic fittings may weaken them substantially or change the internal diameter or provide some type of irregularity along the inner wall of the fitting to obstruct flow therethrough. Furthermore, threaded fittings and those which use compression and potting techniques may also result in contact of corrosive fluids within the pipe with metal components of the coupling, whereby the joint is destroyed in short order.

Finally, the metal and plastic members, the members of the coupling and of the basic tube structures, and the parts of the coupling themselves may have significantly different coefficients of thermal expansion and hence may be prone to damage or corrosive attack when under thermal stress.

OBJECTS OF THE INVENTION

It is, therefore, the principal object of the present invention to provide an improved method of making a pipe coupling whereby the aforementioned disadvantages of earlier systems are avoided.

Yet another object of the invention is to provide an improved pipe coupling which can be inexpensively and conveniently assembled and which is free from the disadvantages of earlier coupling systems.

SUMMARY OF THE INVENTION

These objects and others which will become apparent are attained in accordance with the present invention, in a pipe coupling in which a pipe fitting, generally a pipe bend, Y-fitting, T-fitting or the like, is formed with one or more arms, at least one of which is formed with an annular transverse flange or bead behind which a continuous one-piece coupling ring or collar is to be lodged.

According to the present invention, the pipe fitting is composed of a memory-effect synthetic resin, preferably cross-linked polyethylene, such that the synthetic-resin material has a crystallite melting point or glass-transition temperature below which the flange is generally rigid and undeflectable without breaking.

At or above this crystallite-melting or glass-transition temperature, however, the flanges are elastomeric, rubbery and flexible and, according to the essential feature of the invention, the ring or collar is passed over the flange in the elastoflexible state thereof. Because of the memory effect, upon cooling, the flange is restored to its rigid condition and retains the ring or collar which has an internal diameter less than the outer diameter of the flange.

A further pipe may simply be aligned with the flanged arm of the pipe fitting and provided with a nut or the like threadedly engaging the collar of the flanged fitting to enable the assembly to be joined together or opened and separated. The ring, according to the invention, is closed in the sense that it is fully continuous and endless and in the sense that it is formed from a single piece of material, unlike multipartite coupling rings as have been necessary heretofore. Such multipartite rings have the disadvantage that they are complicated, expensive, prone to distortion as a result of temperature changes, and do not provide a satisfactory backing for the flange over the entire circumference of the tubular arm simply because the segments of the conventional collar are separated to a greater or lesser extent from one another. When the pipe is exposed to high temperatures and/or pressures, this lack of backing or support is particularly disadvantageous.

The present invention relies upon the existence of a rubber-elastic (elastoflexible) or elastomeric state of the synthetic resin. The synthetic resin which is preferred in accordance with the present invention is one which may be more or less thermoplastic and generally has a crystallite structure, i.e. a structure resembling the rigid crystalline condition characterizing many inorganic components. Many resins have such crystallite properties, but I prefer to use polyethylene in a highly crosslinked condition. When crosslinked or ultrahigh-molecular-weight polyethylene is used (with a high degree of crosslinking), the resin has excellent memory effect as well. The term "memory" is used herein to indicate that formed synthetic-resin bodies, heated to an elastomer (rubber-elastic) state, may be deformed, distorted, deflected or otherwise treated, but upon cooling return to their original shape and generally all of their original properties. In other words the flanged end of a pipe fitting or pipe, according to the invention, may be heated to the transition temperature between the normal rigid or crystallite state and the rubber-elastic state, whereupon the continuous ring or collar is thrust over the flange, and thereafter permitted to assume its original temperature and restore the rigid crystallite condition.

The critical transition temperature is referred to variously as a crystallite melting point, i.e. the point at which the crystalline state terminates and an amorphous (but not liquid) state is created. This temperature is also known as the glass-transition temperature $T_g$. The amorphous state or the rubber-elastic state resulting from a heating of the synthetic-resin body above the transition temperature, is indicated not only by the change in properties but also by the fact that crosslinked thermoplastic material, especially high-molecular weight polyethylene, when undyed, are transparent like glass at these temperatures. A rubber-elastic deformation is possible in this state and the original shape will be restored if the material is cooled without constraint. However, the deformed shape will be preserved when the material is cooled if the material is maintained in its deformed state by deforming means such as a tool or shaping member. Frequently it is desirable to form a flange in this way since shaping is simple and does not require special tools and does not involve any weakening of the material.

When cross-linked thermoplastic materials, such as memory-effect polyethylene, are in a rubber-elastic (elastoflexible) state, the locking elements of the present invention in the form of closed rings or collars, can easily be pushed over the flanges of the pipe members at the proposed joint. When the pipe couplings are used to join pipes of the same or similar materials, closed annular locking elements may be pushed also behind the flanges of such pipes. Of course, when fittings, onto which the closed locking elements or collars have been urged in the elastoflexible state, are to be connected to straight pipes, only one end of which is flanged, whether of the same material as the synthetic-resin fitting or of a different material, the locking collar may be applied to such pipes simply by slipping it over the unflanged end. Where the pipe, which is to be joined to the flanged fitting, is composed of a noncross-linked synthetic-resin, a metal or another material without a transition temperature and an elastoflexible state as noted above, and the respective collar cannot be slipped over an unflanged end, the collar must be applied by other conventional means. Such means may include assembling the collar from two or more segments at the higher cost, inconvenience and significant disadvantages noted earlier.

According to still another feature of the invention, the confronting flanged faces are provided with additional sealing elements and, to accommodate these sealing elements, are formed with seats. Preferably, the sealing elements are rubber rings or gaskets of an elastomeric synthetic-resin (e.g. silicone resin) and the seats are formed by providing annular recesses in the flange. It is interesting to note that such seats may be provided in the manufacture of the flanged fitting without regard for the fact that, at a subsequent time, the flange will be deformed in its elastoflexible state. The memory effect restores the flange, with the recess or seat for the seal intact upon cooling. Furthermore, the system of the present invention provides a simple method of forming the seat whereby, as the flanges cool below the transition temperature, it is clamped with the seal or a seal-like ring in place. In this case, the rigidification of the flange will simultaneously reproduce a complementary seat to accommodate the sealing ring. This system has the additional advantage over the prior art that, with previously employed methods and materials, it was impossible to form complex flanges or required complicated and expensive procedures and tools.

Reference has been made herein to locking elements of closed annular configurations and to locking collars. According to the invention, the collar on one of the members to be joined is externally threaded while the collar of the other pipe member is formed with an outwardly extending annular flange or shoulder against which an inwardly extending annular flange or shoulder of a cap nut is designed to bear when this nut is screwed onto the externally threaded collar. The cap nut is provided with an internal thread for this purpose and preferably is of a diameter in excess of the diameters of the flanges over which it extends. Furthermore, the external diameter of the threaded portion of the collar receiving the cap nut and the external diameter of the non-threaded collar both exceed the diameter of the flanges in accordance with the principles of the present invention. The locking elements may include extension means consisting of a thrust ring formed on the cap nut and/or upon a lock nut or thrust rings provided in addition to and guided by the cap nut and/or lock nut.

The pipe couplings, according to the present invention, are formed with the flanges by injection molding or like processes and in all cases I prefer to produce the flanges during the original manufacturing step.

The pipe couplings of the present invention has the advantage that pipes of any material can be joined provided at least one member of each joint is composed of a memory-effect synthetic-resin of the character described. Preferably, the junction is effected by means of pipe bends, tee fittings or the like of cross-linked polyethylene. The fittings may be provided at any desired location and, in fact, flanges may be provided in situ by simple spinning procedures without a backing mold. The heating of the flanges to the transition temperature may be effected by an open flame directed at the pipe, by immersing the end of the fitting in a hot bath or the like. Furthermore, the threaded members and collars of the coupling can be replaced, supplied or removed as often as desired if the flanges are heated each time to the elastoflexible condition. In practice, no limit has been found to the number of times the flanges may be heated and restored to their rigid state upon cooling. It is also sufficient if the locking collars fit loosely on the pipe behind the respective flanges so that the internal diameters of the collars may exceed somewhat the external diameter of the pipes upon which they are mounted, provided that they nevertheless are less than the external diameters of the flanges. The loose fit prevents excessive heating of the locking collars so that the latter can be made from any desirable materials. Since the flanges abut sealingly, there is no danger that corrosive materials flowing through the pipe will contact the locking collars or nut.

DESCRIPTION OF THE DRAWING

The above and other objects, features and advantages of the present invention will become more readily apparent from the following description, reference being made to the accompanying drawing in which.

SPECIFIC DESCRIPTION AND EXAMPLE

Figure 1:
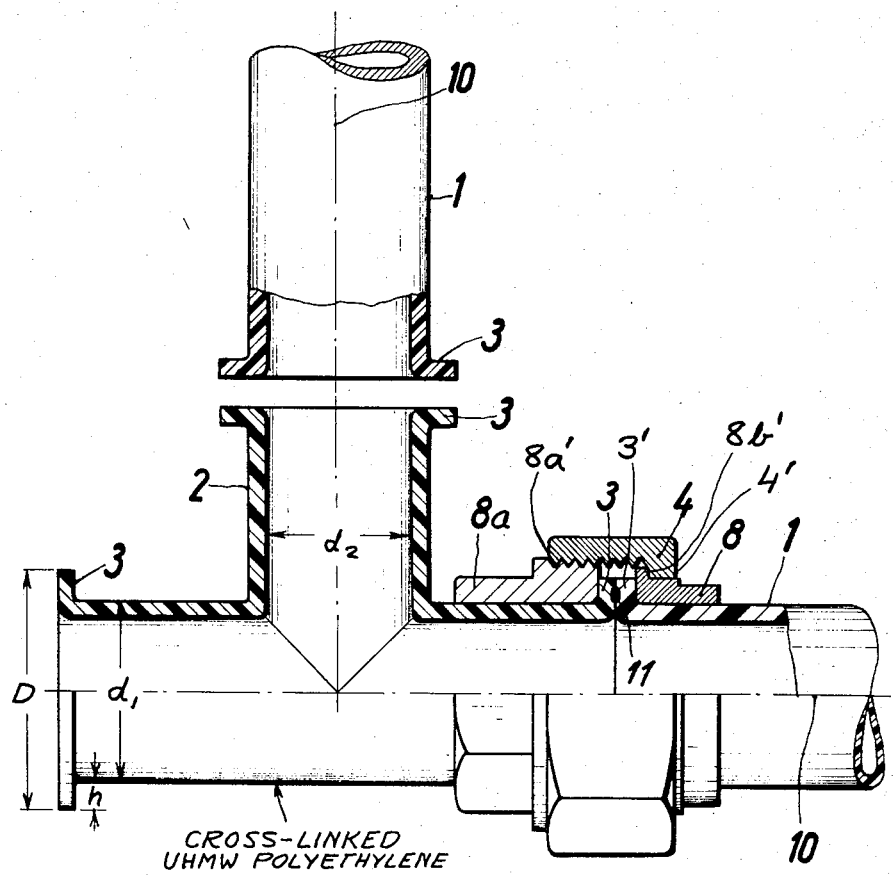
FIG. 1 is a partial axial cross-sectional view showing a coupling made with a tee fitting, according to the present invention.

In FIG. 1 of the drawing, I show a pair of pipes 1 which are to be joined to a tee fitting generally designated at 2 and provided with three arms, each of which is formed with a circumferential transverse flange 3 when the tee fitting is injection molded. The tee fitting and the pipe are composed of a high-molecular-weight polyethylene of the highly cross-linked type.

Figure 2:
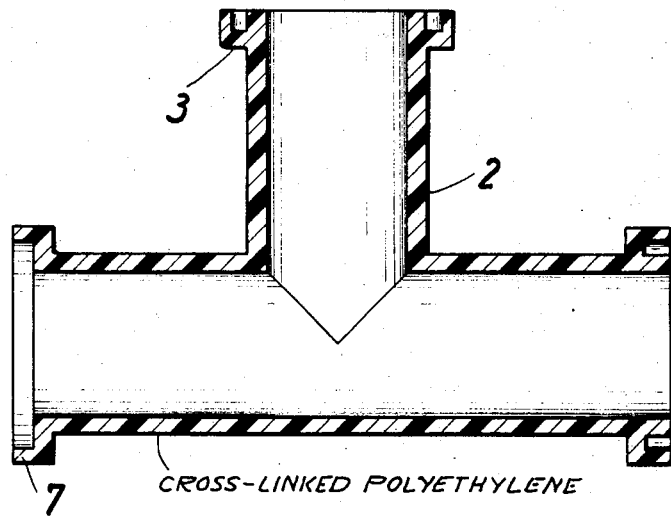
FIG. 2 is a cross-sectional view through a tee fitting according to another embodiment.

The flanges 3 each have a diameter D of 4.1cm while the external diameter of the pipes and arms $d_1$ is about 3.2cm. The internal diameter $d_2$ is about 2.5cm and the radial height $h$ of each flange is 4 to 5mm. The flanges are formed during injection molding of the pipe. A threaded collar 8a whose internal diameter is slightly greater than $d_1$, preferably about 3.4cm to 3.5cm is fitted over the flange 3 at the right-hand side of the tee fitting after the latter is heated in a butane-torch flame to a rubber-elastic transparent condition. As the flange temperature falls, the rigid condition of the flange is restored. The collar 8a has a threaded portion 8a' whose external diameter exceeds the diameter D and may be about 4.8cm so that it projects outwardly beyond the flange. Another collar 8b forms a thrust nut behind the flange 3' of a pipe 1 aligned along the axis 10 with the corresponding arm of the fitting. The collar 8b likewise has an internal diameter of about 3.4 to 3.5cm and is thrust over the flange 3' after the latter has been heated to the elastoflexible state as described. The collar 8b has a shoulder 8b' retaining the inwardly projecting shoulder 4' of a cap nut which fits over the flanges and is threaded onto the ring 8a. Both the ring 8a and the cap nut are provided with hexagonal configurations to receive the respective wrenches. The sealing ring 11 may be clamped between the flanges and, to this end, the front face of the flange, may be provided with a recess 6 coaxial with the flange and in the form of a groove (FIG. 2) or as shown at 7 as a step enlargement of the flow passage. Similar locking means 8a, 8b and 4 may be provided for all of the arms of the fitting.

I claim:

1. A method of making a pipe coupling comprising the steps of:

forming a pipe fitting with a plurality of tubular arms from a memory-effect synthetic resin having a crystallite melting point; forming on at least one of said arms an annular transverse flange which is rigid at temperatures below said crystallite melting point;

heating said flange to a temperature at least equal to said crystallite melting point; thrusting a generally rigid ring with an internal diameter less than the external diameter of said flange over said one of said arms in order to deflect said flange in an inwardly direction while said flange remains at said temperature; permitting said flange to cool after said ring has been thrust thereover to a temperature less than said crystallite melting point thereby restoring said flange to its original shape; and connecting a flanged pipe to the ring by drawing the flange of said pipe axially against the flange of said fitting.

2. The method defined in claim 1, wherein said memory-effect synthetic resin is a cross-linked polyethylene.

3. The method defined in claim 1 wherein said flange is formed on said one of said arms by spinning the same in a plastically deformable state of said fitting.

4. The method defined in claim 1 wherein the pipe is connected to the ring by threading a nut carried by said pipe onto said ring.

* * * * *